Nov. 15, 1960  C. B. BARLOW  2,960,287
FLOATING JOINT
Filed Aug. 5, 1957  3 Sheets-Sheet 3
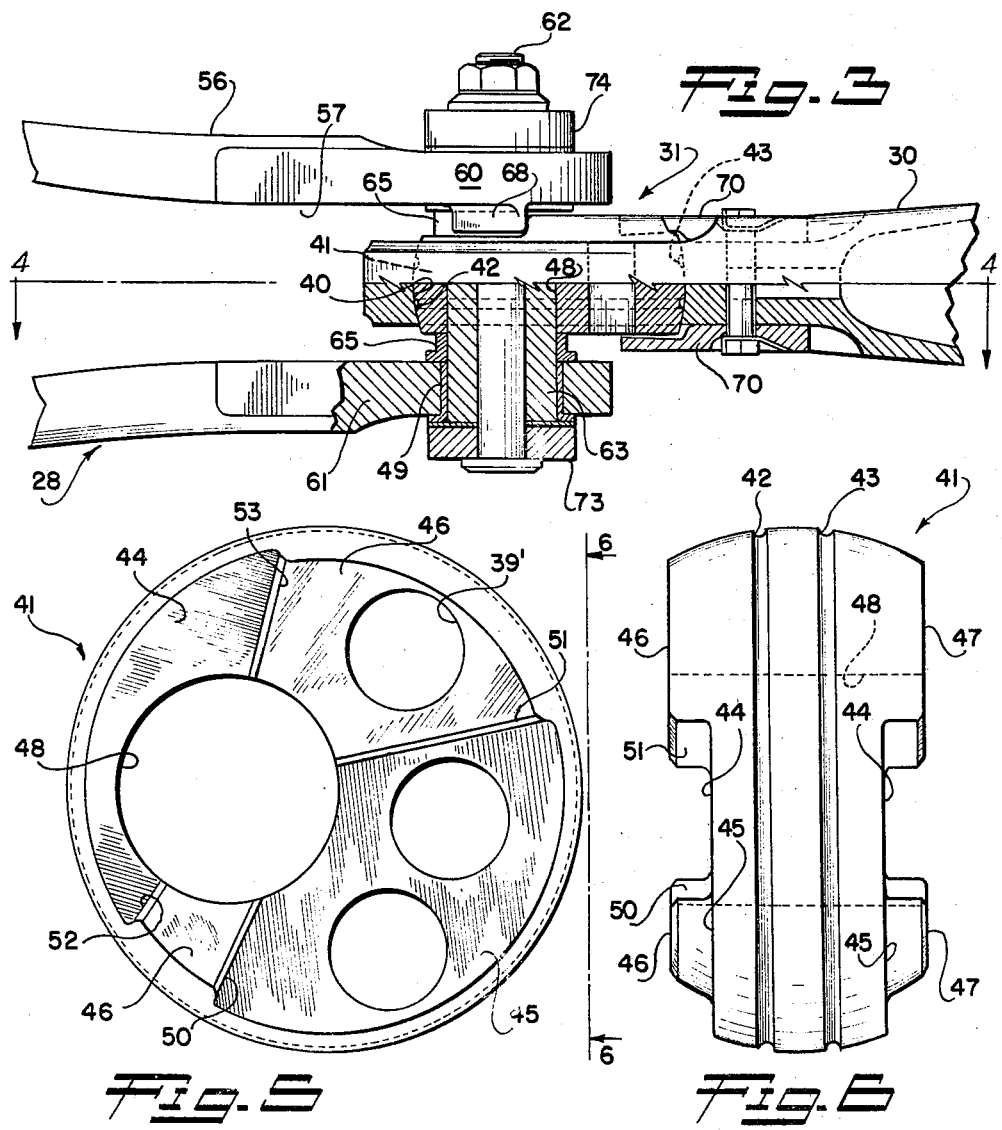
INVENTOR.
CHARLES B. BARLOW
BY
George C. Sullivan
Agent

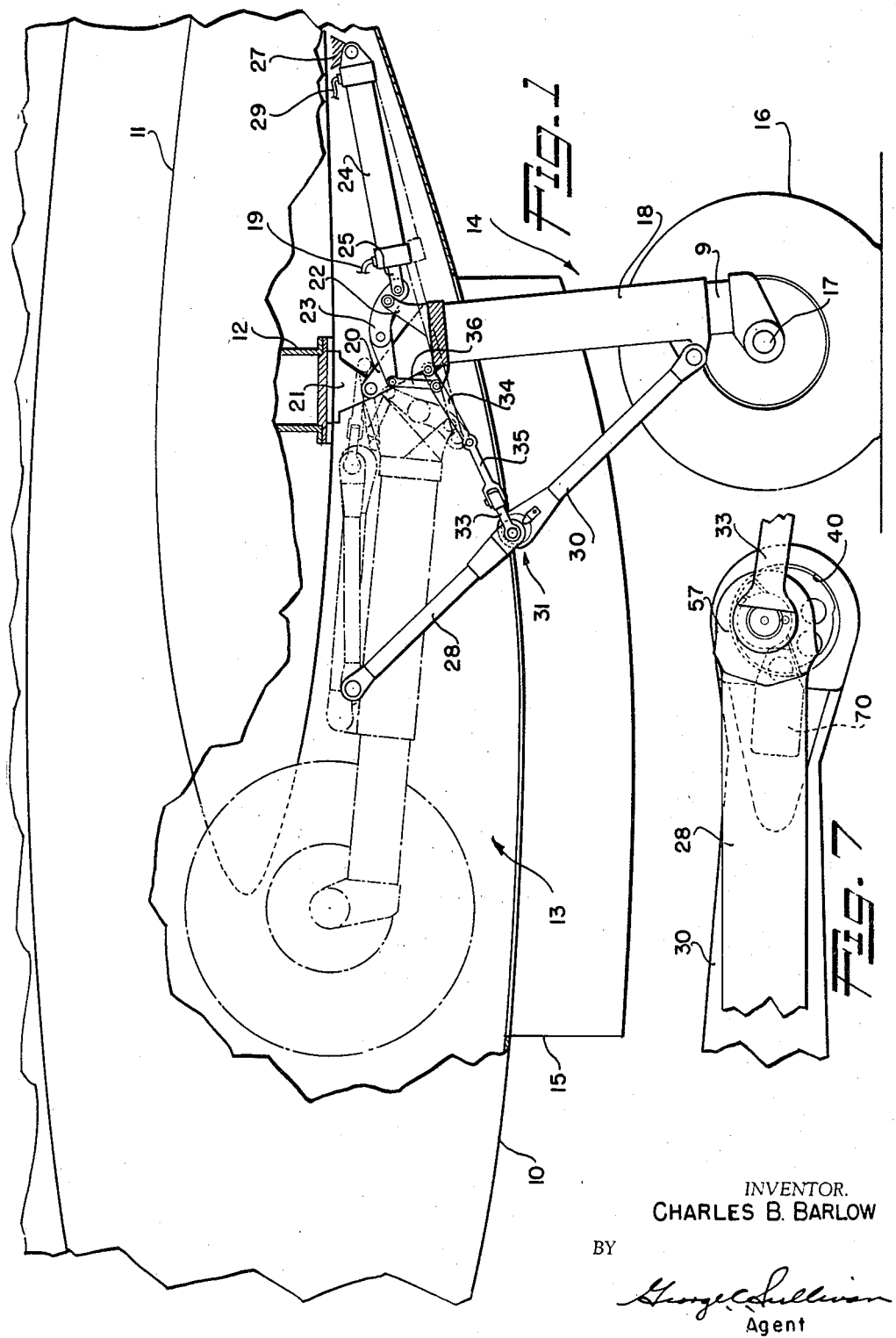

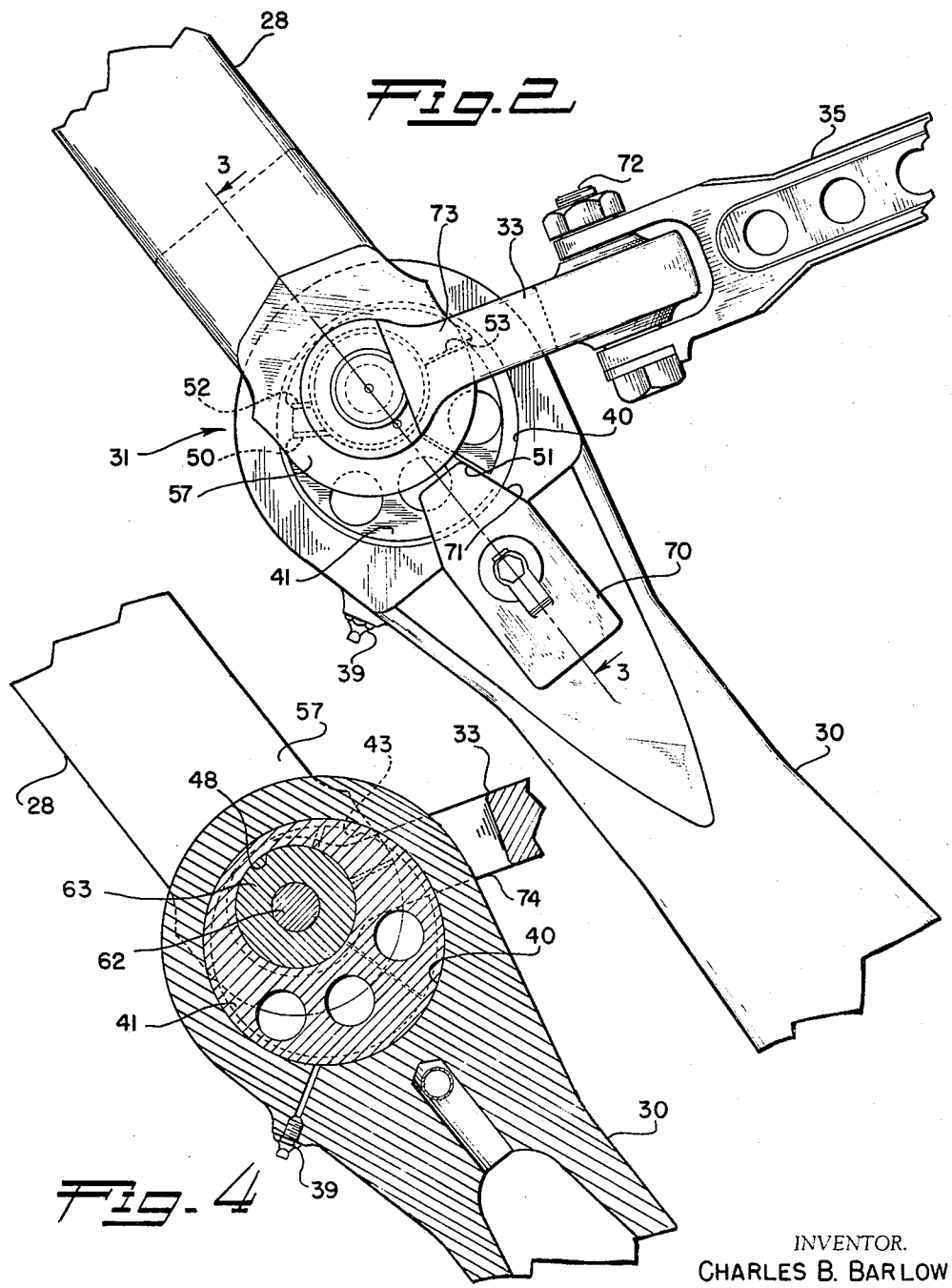

United States Patent Office 2,960,287
Patented Nov. 15, 1960

2,960,287

FLOATING JOINT

Charles B. Barlow, Altadena, Calif., assignor to Lockheed Aircraft Corporation, Burbank, Calif.

Filed Aug. 5, 1957, Ser. No. 676,167

7 Claims. (Cl. 244—102)

This invention relates to aircraft landing gear of the retractable or folding type and more particularly, to a landing gear having a pivotal drag strut employing a floating joint.

High speed aircraft having thin wing construction limits the amount of space available in the wings for the installation of aircraft components or equipment, particularly landing gear. It is generally the practice of aircraft designers to mount the aircraft power plants in pods, as they apply to jet engines, or in nacelles as is the common term for reciprocating engine housings. The pods or nacelles, whichever the case, are usually mounted on the wing structure at a distance outboard from the fuselage and much of the space available therein is occupied by the engine and accessories.

Some landing gear designs call for the landing gear to retract into the engine nacelle. This type of landing gear installation determines the location of the nacelle as the aircraft designer must consider the minimum lateral overturn angle of the aircraft. A too narrow tread between the landing wheels gives the aircraft a critical overturn angle. If, to correct for the critical overturn angle, the nacelle is moved farther outboard on the wing, then the designer is faced with a problem of a complicated wing joint. Also, the farther the nacelle is moved outward of the wing the more difficult the single engine operation of a dual engine aircraft will become.

If the landing gear is retracted into the wing then the wing box beam must be cut. This type of installation would then call for a large structural weight increase to carry the torque. If the landing gear is to be retracted into the nacelle below the lower wing skin, or box beam, the nacelle should preferably be located far enough outboard as to be in a thin section of the wing. The designer strives toward locating a storage compartment for the landing gear in the lower frontal area of the nacelle but in such a manner so as not to violate the wing box beam. To achieve this end, it is desirable to fold the drag strut associated with the landing gear into the smallest possible space.

Retracting landing gear as employed in conventional practice uses a drag strut comprising a "jacknifing" linkage which when the landing gear is extended serves to support and stabilize the landing gear to the wing of the airplane. Generally, the drag strut comprises two linkages having fixed pivot points located on the wing or nacelle and a second pivot point located on the main shock strut. In the past aircraft designers have had to provide an enlarged pocket to receive the retractable landing gear which is substantially larger than necessary to accommodate the landing gear so that a common joint of the two linkages of the drag strut may be accommodated during folding.

Furthermore, in order that the drag strut give maximum support to the landing gear with respect to the wing or airplane, it is highly desirable that the drag strut be fixed at one of its ends as close to the axle of the landing gear as possible.

Accordingly, the present invention provides a retractable landing gear for an airplane having a minimum pocket adapted to receive the retracted gear which includes a floating ball joint connecting two links of the drag strut. The ball joint is characterized by its ability to freely float from its normally restricted position. This is achieved by having an eccentric ball in the terminal of one of the links having its rotation controlled by wrench keys attached to the other link. Several lugs are provided which engage slots in the face of the ball. The arrangement of lugs and slots provides positive positioning of the eccentric ball axis on the axis of the drag struts when they are extended, and offset from the axes of the drag struts when the links are jacknifed. Thereby, free rotative over-travel of the ball is allowed when in the jackknife position to compensate for variations of link length.

It is another object of the present invention to provide a drag strut on a retractable landing gear having a pair of fixed points wherein one fixed pivot point is located in close proximity to the axle of the landing gear.

It is another object of the present invention to provide a retractable landing gear having a drag strut that can be jacknifed during retraction without necessitating an enlarged area within the landing gear stowage pocket.

Another object of the present invention is to provide a landing gear of the retractable type of reduced weight and adapted to occupy a small place.

Still a further object of the present invention is to provide a drag strut for a retractable landing gear having a pair of fixed pivot points which permits folding of linkages comprising the drag strut so that the drag strut may be pivoted to a substantially flush position with respect to the upper retracted position of the landing gear.

A further object of the invention is to provide a means employed in a retractable landing gear for compensating manufacturing tolerances on lengths of parts and location of pivot points by employing the free angular action of a ball joint.

With the above objects in mind and with other objects becoming apparent as the specification is read, the novelty of the present invention will become readily apparent from the drawings accompanying the specification and from the claims which appear at the end of said specification.

Figure 1 is a side view of the invention showing the landing gear, in solid lines, in the extended position and by broken lines in its static or fully retracted position;

Figure 2 is an enlarged view of the floating joint of the drag strut pivotally connecting a pair of linkages comprising the drag strut;

Figure 3 is a partial sectional view taken in the direction of arrows 3—3 of Figure 2;

Figure 4 is a sectional view of the joint shown in the direction of arrows 4—4 of Figure 3;

Figure 5 is a side view of the eccentric ball employed in the joint of the above figures;

Figure 6 is an end view of the ball shown in Figure 5 taken in the direction of arrows 6—6; and Figure 7 is an enlarged view of the drag strut shown in broken lines in Figure 1 when the landing gear is retracted.

With reference to Figure 1, an engine nacelle 10 is shown which may be carried outboard of the fuselage of an airplane which is suitably supported on a wing 11 having a main wing box beam 12. Forward of the wing within the nacelle, there is provided a storage compartment 13 for stowing a landing gear 14 during flight when the airplane landing gear is retracted. A door 15 is employed for closing off the storage compartment 13 in order to reduce aerodynamic drag during airplane flight.

Landing gear 14 comprises at least one wheel 16 rotatably mounted on an axle 17 carried by a piston 9 journaled within a main shock strut cylinder 18. The upper portion of cylinder 18 is provided with a bracket 20 which is pivotally attached to the wing box beam 12 by a mounting 21. Cylinder 18 is provided with an arm 22 secured to the upper end of cylinder 18 adjacent bracket 20 which pivotally carries a bell crank 23. Landing gear 14 is pivoted about mounting 21 by means of a hydraulic system which includes cylinder 24 and a piston rod 25. Cylinder 24 is pivotally attached to the wing structure by means of a mounting 27 whereas piston rod 25 is pivotally attached to one end of bell crank 23 at a point which is lower than the attachment of arm 22 to bell crank 23. Actuation of this hydraulic system via lines 19 and 29 leading to a hydraulic fluid source (not shown) causes piston 25 to recede or advance from within cylinder 24 to cause bell crank 23 to pivot about its connection with arm 22.

In its extended position, landing gear 14 is supported with respect to the nacelle by means of a drag strut comprising an upper drag strut 28 and a lower drag strut 30. Upper and lower drag struts 28 and 30 are joined by a common pivotal knee joint 31, to be described with reference to other figures. Upper drag strut 28 is pivotally fixed to the nacelle structure on its end opposite to its end connected to lower drag strut 30. Lower drag strut 30 is pivotally connected to the main strut cylinder 18 on its end opposite to the end connected to upper drag strut 28.

In order to offer stability to the landing gear when the gear is fully extended and to insure that the drag strut will not pivot about knee joint 31, the landing gear is provided with a bracing means pivotally coupling the knee joint 31 to the upper end of the main strut cylinder 18. This bracing means comprises a member 33 coupled to the knee joint 31 and a pair of upper and lower jury struts 34 and 35.

The lower jury strut is pivotally connected to member 33 and the upper jury strut is pivotally connected to the upper main cylinder 18. Also, the upper jury strut 34 is pivotally connected by a link 36 to the end of bell crank 23 opposite to its end connected to piston 25. The bracing means is connected to bell crank 23 via link 36 so that advancement of piston rod 25 from cylinder 24 which pivots bell crank 23 will also cause the upper and lower jury struts to pivot with respect to each other and break the rigid knee joint 31 connecting the upper and lower drag struts. When the landing gear is fully extended, struts 34 and 35 form an over-center toggle linkage which remains rigid until their connecting joint is broken.

With reference to Figure 2, floating knee joint 31 is shown in an enlarged view wherein lower drag strut 30 is provided with an aperture 40 on its end opposite to its end attached to cylinder 18 which retains a ball 41 rotatably carried therein. As shown in Figures 5 and 6, the ball includes a pair of grooves 42 and 43 into which lubricant such as grease may be carried and a pair of notches 44 and 45. A grease fitting 39 may be employed which communicates the grooves exteriorly of the joint. Notches 44 and 45 are provided in face 46 of the ball and it is understood that face 47 of the ball includes identical notches 44 and 45. Ball 41 is further provided with several lightening holes such as hole 39' and is further provided with a pivot hole 48 which is offset from the central axis of the ball. The position of the hole 48 allows the ball to rotate eccentrically. Notch 45 is defined by a pair of opposing surfaces 50 and 51 while notch 44 is defined by surfaces 52 and 53. Surfaces 50 and 51 are raised with respect to notch 45 and communicate with surfaces 52 and 53 by means of raised portions 46 and 47. Ball 41 is eccentrically carried by the end of drag strut 28 opposite to its end connected to the fixed structure of the nacelle by means of a yoke having a space 57 into which the end of lower drag strut 30 is projected. The yoke further comprises a pair of parallel legs 60 and 61 defining space 57 through which a bolt 62 passes. Bolt 62 is carried between the parallel legs by a roller 63 on which the ball 41 is mounted by means of hole 48.

As shown in Figure 3, each leg of the yoke is provided with bearings 49 journaled onto the leg which rotatably supports roller 63. Between the inner surfaces of the parallel legs of the yoke and the ball 41, there is provided spacers, such as spacer 65. Each leg is provided with a projection, such as projection 68 which projects into notches 44 associated with faces 46 and 47 of ball 41. In the landing gear's normally extended position, projections 68 engage with surfaces 53 of the ball. Lower drag strut 30 is further provided with a pair of wrench keys 70 which project into notches 45 defined by surfaces 50 and 51 of ball 41. In the normally extended position of the landing gear, surface 71 of the key is in engagement with surface 51 of ball 41.

Member 33 is pivotally attached to lower jury strut 35 by means of a bolt and nut arrangement 72 and is provided on its opposite end with a yoke having parallel legs 73 and 74.

In actual operation, landing gear 14 is pivoted about mounting 21 into storage compartment 13 by actuating the hydraulic system in which cylinder 24 and piston rod 25 is included. Advancing piston rod 25 from cylinder 24 causes bell crank 23 to pivot about its connection on rigid arm 22. The pivoting of bell crank 23 raises its end opposite to its end coupled to piston rod 25 so that link 36 coupling the bell crank to the upper jury strut 34 causes the upper jury strut 34 to pivot about its connection with bracket 20. The pivotal action of upper jury strut 34 causes its pivotal connection with lower jury strut 35 to over travel a dead center line existing between joint 31 and the pivotal connection of upper jury strut 34 with bracket 20. This over travel causes the upper and lower jury struts to crack joint 31 releasing the drag strut from a rigid condition.

The cracking of joint 31 causes the upper and lower drag struts 28 and 30 to pivot about their fixed pivotal points attached to the structure of the nacelle and cylinder 18 of the main landing gear respectively.

As piston rod 25, which operates on a position arm about pivot center pin 21, continues to advance and inasmuch as joint 31 is cracked at this time, the landing gear will pivot about its connection with mounting 21 as the joint 31 is pulled upward by the pivotal action of the upper and lower jury struts. Key 70 carried by the lower drag strut leaves engagement with surface 51 of ball 41 and engages surface 50 of the ball. While the keys are disengaged with either surface 50 or 51, the ball may float within aperture 40 provided in the end of lower drag strut 30. Inasmuch as ball 41 rotates about roller 63, there is no axial binding action occurring between the aperture 40 and the periphery of ball 41 during rotation.

Key 70 continues to actuate the eccentric rotation of ball 41 until the upper end of lower drag strut 30 is substantially parallel with the other strut as shown in Figure 7. At this time projection 68 carried by each leg of yoke 56 has left engagement with surfaces 53 associated with faces 46 and 47 of the ball 41 and is in engagement with surfaces 52 associated with faces 46 and 47. Angular travel of ball 41 about its center 48 is provided by allowing angular clearance between surfaces 50 and 51 and key 70 and between projections 68 and surfaces 52 and 53.

Thus it can be seen that the drag strut may be withdrawn into storage compartment 13 in such a manner that joint 31 does not extend above the fixed pivot point of the upper drag strut 28 within the nacelle during retraction of gear 14.

Having described only typical forms of the invention I do not wish to be limited to the specific details herein set forth, but wish to reserve to myself any variations or modifications that may appear to those skilled in the art and fall within the scope of the following claims.

I claim:

1. In a retractable landing gear for use on an airplane wing, the combination comprising, a shock strut pivotally mounted at one end to said wing having a wheel rotatably carried on the other end, a pair of serially aligned pivotally connected linkages, one of which is pivotally secured to said wing at its remote end and the other of which is pivotally secured to said strut in close proximity to said wheel at its remote end, bracing means pivotally connected at one end to said linkages at their pivotal connection and pivotally connected on its opposite end to said shock strut adjacent the wing, the pivotal connection of said linkages and said bracing means including an eccentric pivot axis which substantially intersects the axis of said connected linkages when said gear is in extended position, and off-set from the axes of at least one of said linkages when said gear is in retracted position whereby said gear occupies a minimum of space in said wing when retracted.

2. In a retractable landing gear as in claim 1 said bracing means including a mechanical toggle linkage.

3. In a retractable landing gear as in claim 1 said linkages being of unequal length, a bell crank connected to said strut and said bracing means, and fluid pressure means connected to said bell crank, to collapse said bracing means when said gear is in extended position and subsequently to move said gear into retracted position.

4. In a retractable landing gear for use on an airplane wing, the combination comprising, a shock strut pivotally mounted at one end to said wing having a wheel rotatably carried on the other end, a pair of serially aligned pivotally connected linkages, one of which is pivotally secured to said wing at its remote end and the other of which is pivotally secured to said strut in close proximity to said wheel at its remote end, bracing means pivotally connected at one end to said linkages at their pivotal connection, the pivotal connection of said linkages and said bracing means including, a rotatable ball having an eccentric hole off-set from the central axis of said ball and mounted on the pivotal connection end of one linkage, a pivot pin passing through the hole in said ball and carried on the pivotal connection end of other linkage, and said bracing means pivotally connected at one end to said pivot pin and pivotally connected at the opposite end to said shock strut adjacent said wing, the axis of said pivot pin being substantially intersected by the axis of said connected linkages when said gear is in extended position, and off-set from the axes of at least one of said linkages, when said gear is in the retracted position, whereby said gear occupies a minimum of space in said wing when retracted.

5. In a retractable landing gear as in claim 4 said linkages being of unequal length, a bell crank connected to said strut and said bracing means, and fluid pressure means connected to said bell crank to collapse said bracing means when said gear is in extended position and subsequently to move said gear to retracted position.

6. In a retractable landing gear as in claim 5, said ball having a pair of opposed notches on at least one face thereof, and a key carried on the linkage mounting said ball fixed in engagement with one of said notches, and a fixed lug projecting into the other notch, said lug carried by said other linkage on its pivotal connection end.

7. In a retractable landing gear as in claim 4 said bracing means including a mechanical toggle linkage.

References Cited in the file of this patent
UNITED STATES PATENTS 2,826,381  Cruz ------------------ Mar. 11, 1958